(12) United States Patent
Haye (10) Patent No.: US 12,540,882 B2
(45) Date of Patent: Feb. 3, 2026

(54) ACCRETION DETECTION SYSTEMS AND ASSOCIATED METHODS FOR GAS TURBINE ENGINES

(71) Applicant: RTX CORPORATION, Farmington, CT (US)

(72) Inventor: Sheridon Haye, College Station, TX (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/295,875

(22) Filed: Aug. 11, 2025

(65) Prior Publication Data

US 2025/0369829 A1     Dec. 4, 2025

Related U.S. Application Data

(62) Division of application No. 18/454,316, filed on Aug. 23, 2023, now Pat. No. 12,385,808.

(51) Int. Cl.
| | | |
|---|---|---|
| *G01M 15/14* | (2006.01) | |
| *F01D 21/00* | (2006.01) | |
| *F01D 21/10* | (2006.01) | |
| *F01D 25/32* | (2006.01) | |

(52) U.S. Cl.
CPC ........... *G01M 15/14* (2013.01); *F01D 21/003* (2013.01); *F01D 21/10* (2013.01); *F01D 25/32* (2013.01); *F05D 2260/607* (2013.01); *F05D 2270/334* (2013.01)

(58) Field of Classification Search
CPC ............... F01D 21/10; F05D 2260/607; F05D 2270/334; G01M 15/14
See application file for complete search history.

(56) References Cited

U.S. PATENT DOCUMENTS

| | | |
|---|---|---|
| 4,335,600 A | 6/1982 | Wu |
| 9,327,839 B2 | 5/2016 | Giles et al. |
| 10,385,723 B2 | 8/2019 | Flynn et al. |
| 11,702,939 B2 | 7/2023 | Riverin |
| 2002/0059831 A1 | 5/2002 | Naudet |
| 2007/0194773 A1 | 8/2007 | Dankert et al. |
| 2020/0224550 A1* | 7/2020 | Dischinger ............. F01D 21/10 |

FOREIGN PATENT DOCUMENTS

BE     1024951     8/2018

OTHER PUBLICATIONS

European Search Report for European Patnet Application No. 24195628.3 mailed Jan. 23, 2025.

* cited by examiner

Primary Examiner — Scott J Walthour
(74) Attorney, Agent, or Firm — Carlson, Gaskey & Olds, P.C.

(57) ABSTRACT

An assembly for a gas turbine engine according to an example of the present disclosure may include at least one rotatable airfoil, at least one vibration sensor operable to detect vibration of the at least one airfoil at one or more rotational frequencies, and a controller operatively coupled to the at least one vibration sensor. The controller may be operable to determine an accretion level associated with accretion of glass on the at least one airfoil in response to comparing vibration of the at least one airfoil at the one or more rotational frequencies to a vibratory pattern associated with accretion of glass. A method of operation is also disclosed.

17 Claims, 5 Drawing Sheets

ACCRETION DETECTION SYSTEMS AND ASSOCIATED METHODS FOR GAS TURBINE ENGINES

CROSS REFERENCE TO RELATED APPLICATION

This application is a divisional of U.S. patent application Ser. No. 18/454,316, filed Aug. 23, 2023, which is incorporated herein by reference in its entirety.

BACKGROUND

This disclosure relates to detecting a condition of gas turbine engine components.

Gas turbine engines may include a fan for propulsion air. The fan may also deliver air into a core engine where it is compressed. The compressed air is then delivered into a combustion section, where it is mixed with fuel and ignited. The combustion gas expands downstream over and drives turbine blades.

The engine may ingest particulates during operation in various environmental conditions, which may be deposited on surface of the components.

SUMMARY

An assembly for a gas turbine engine according to an example of the present disclosure may include at least one rotatable airfoil, at least one vibration sensor operable to detect vibration of the at least one airfoil at one or more rotational frequencies, and a controller operatively coupled to the at least one vibration sensor. The controller may be operable to determine an accretion level associated with accretion of glass on the at least one airfoil in response to comparing vibration of the at least one airfoil at the one or more rotational frequencies to a vibratory pattern associated with accretion of glass.

In a further embodiment of any of the foregoing embodiments, the controller may be operable to cause an indicator to be generated in response to determining that the accretion level meets an accretion threshold.

In a further embodiment of any of the foregoing embodiments, the controller may be operable to determine a brittleness characteristic associated with accretion of glass based on the accretion level.

In a further embodiment of any of the foregoing embodiments, the controller may be operable to cause excitation of the at least one airfoil to release debris associated with the accretion level in response to determining that the accretion level meets an accretion threshold.

In a further embodiment of any of the foregoing embodiments, the controller may be operable to cause excitation of the at least one airfoil in response to causing a rotational speed of the at least one airfoil to approach a resonant frequency of the at least one airfoil.

In a further embodiment of any of the foregoing embodiments, the vibratory pattern may be associated with the one or more rotational frequencies and one or more respective vibration thresholds.

In a further embodiment of any of the foregoing embodiments, the controller may be operable to determine the accretion level in response to comparing at least one amplitude associated with vibration of the at least one airfoil at the respective rotational frequency to the respective vibration threshold. The vibratory pattern may be established based on different amounts of accretion of glass and associated vibration for each of the amounts of accretion of glass at the rotational frequencies.

In a further embodiment of any of the foregoing embodiments, the one or more rotational frequencies may include a plurality of rotational frequencies associated with the vibratory pattern. The one or more vibration thresholds may include a plurality of vibration thresholds associated with the respective rotational frequencies. The at least one amplitude may include a plurality of amplitudes associated with the respective rotational frequencies. The controller may be operable to determine the accretion level in response to determining that the amplitudes meet the respective vibration thresholds.

In a further embodiment of any of the foregoing embodiments, the controller may be operable to determine the accretion level in response to determining a best fit of vibration at the one or more rotational frequencies to a set of vibratory responses associated with the vibratory pattern and respective amounts of accretion.

In a further embodiment of any of the foregoing embodiments, at least one airfoil may be propulsor blade for generating thrust.

A gas turbine engine according to an example of the present disclosure may include a propulsor section including a propulsor, a compressor, a turbine that drives the propulsor, a plurality of airfoils rotatable about an engine axis, at least one vibration sensor operable to generate a signal associated with vibration of one or more of the airfoils at one or more rotational frequencies, and a controller operatively coupled to the at least one vibration sensor. The controller may be operable to determine an accretion condition associated with glass accretion on the one or more respective airfoils in response to comparing the signal to a vibratory pattern.

In a further embodiment of any of the foregoing embodiments, the one or more rotational frequencies may include a plurality of rotational frequencies associated with rotation of the airfoils about the engine axis. The vibratory pattern may be associated with the rotational frequencies and a plurality of respective vibration thresholds. The controller may be operable to determine the accretion condition in response to comparing an amplitude associated with the signal to the vibration threshold associated with the respective rotational frequency.

In a further embodiment of any of the foregoing embodiments, the controller may be operable to cause excitation of one or more of the airfoils to remove glass on the one or more respective airfoils in response to determining the accretion condition.

In a further embodiment of any of the foregoing embodiments, the controller may be operable to cause a change in a rotational speed of the airfoils such that the rotational speed approaches a resonant frequency of the airfoils.

A method of operation associated with a gas turbine engine according to an example of the present disclosure may include establishing a vibratory pattern based on accretion of glass at one or more rotational frequencies, determining vibration of a rotatable airfoil at the one or more rotational frequencies, and determining an accretion of glass on the airfoil in response to comparing the determined vibration to the vibratory pattern.

In a further embodiment of any of the foregoing embodiments, determining the vibration may include determining one or more amplitudes associated with the vibration at the one or more rotational frequencies.

In a further embodiment of any of the foregoing embodiments, establishing the vibratory pattern may include establishing one or more vibration thresholds associated with accretion of glass at the one or more respective rotational frequencies. Determining the accretion may include determining that the one or more amplitudes meet the one or more respective vibration thresholds.

A further embodiment of any of the foregoing embodiments may include generating an indicator in response to determining the accretion.

A further embodiment of any of the foregoing embodiments may include exciting the airfoil to release at least a portion of the glass from the airfoil in response to determining the accretion.

In a further embodiment of any of the foregoing embodiments, exciting the airfoil may include changing a rotational speed of the airfoil such that the rotational speed approaches a resonant frequency of the airfoil.

The present disclosure may include any one or more of the individual features disclosed above and/or below alone or in any combination thereof.

The various features and advantages of this disclosure will become apparent to those skilled in the art from the following detailed description. The drawings that accompany the detailed description can be briefly described as follows.

BRIEF DESCRIPTION OF THE DRAWINGS

Like reference numbers and designations in the various drawings indicate like elements.

DETAILED DESCRIPTION

Disclosed are techniques for detecting the accretion of glass and/or other debris that may be disposed on surfaces of gas turbine engine components. The disclosed techniques may be utilized for prognostics and diagnostics to improve the performance and durability of the components, including during flight and/or maintenance. Debris may be ingested by an associated engine during operation in various environmental conditions. The debris may bond or otherwise accumulate on the component surfaces. The debris may form into glass on the surfaces due to heat exposure.

A detection system may be operable to detect the presence and/or amount of accretion of glass and/or other debris on surfaces of the component, such as a rotatable airfoil (e.g., blade). The system may be operable to compare a blade-pass vibratory mode relative to a baseline non-accreted blade to perform the determination. A model may be representative of a state of the glass (e.g., brittleness). The system may be operable interact with one or more sensors and/or aircraft systems to track or otherwise monitor conditions associated with glass accretion (e.g., dust ingestion, temperature, and pressure). The sensor(s) may include one or more vibration sensors positioned adjacent to the components. The system may be operable to determine the state of the glass and/or debris based on the determined conditions. The accumulation of glass and/or other debris may cause a change in flutter frequency of the component. The system may be operable to determine the change in flutter frequency. In implementations, the system may be operable to correlate an amount of glass to a vibratory response pattern as measured by the vibration sensor(s). The system may be operable to cause a change in the condition of components associated with the detected accretion. In implementations, the system may be operable to cause excitation of the airfoil near a predetermined blade mode (e.g., resonant frequency) to induce short term flutter to relieve the airfoil of the accumulated glass and/or other debris. The system may be operable to determine an amplitude of the blade frequency subsequent to the excitation for determining the effectiveness of the shedding. Exciting the component may occur over one or more intervals during the same flight cycle (e.g., in flight) and/or maintenance cycle or may occur for fewer than each flight and/or maintenance cycle of the engine.

Figure 1:
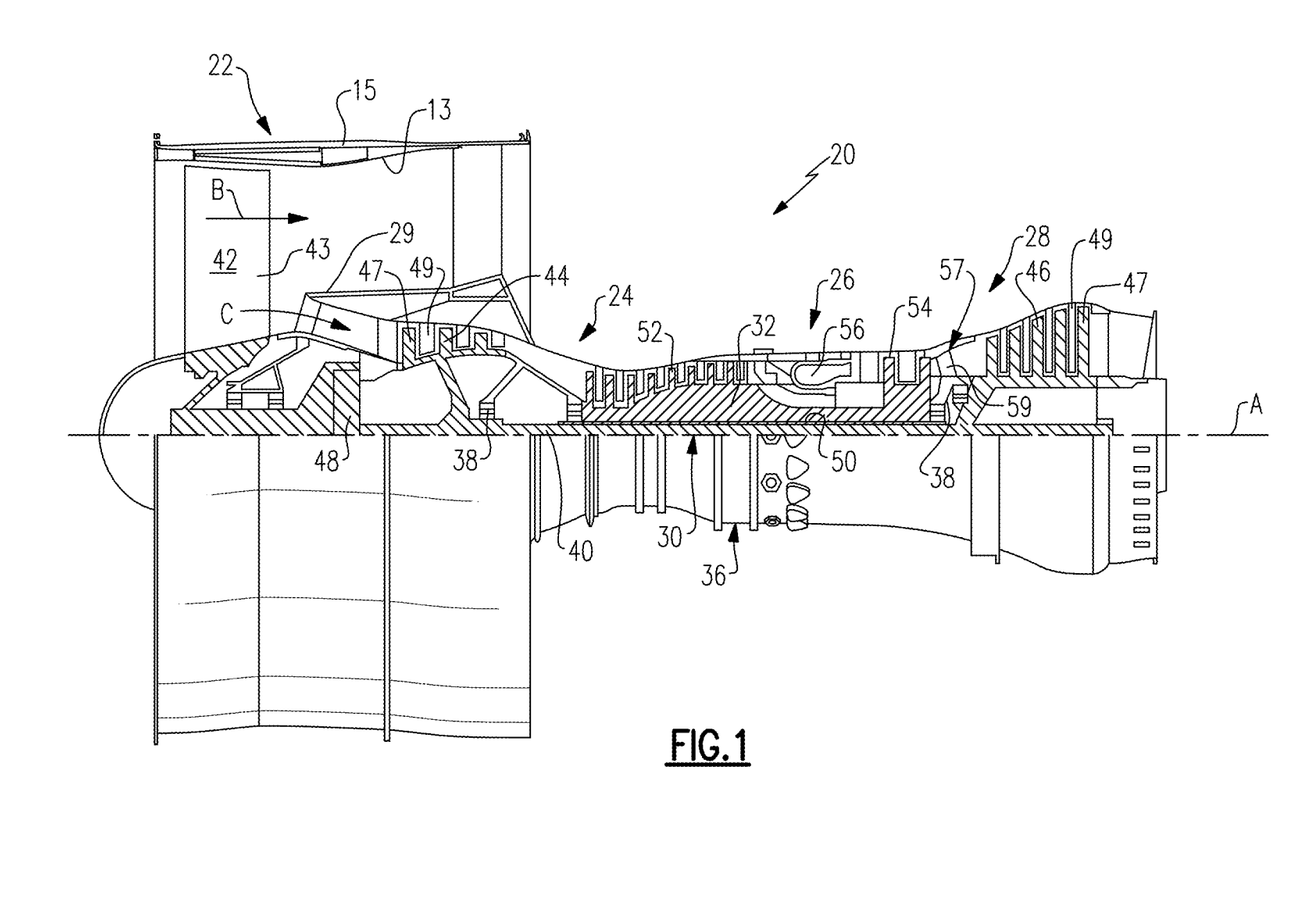
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram}° \text{R})/(518.7° \text{R})]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

The engine 20 may operate in environmentally degraded conditions, such as sand storms, soot clouds, etc. The engine 20 may ingest foreign debris or particulates during operation. These may include calcium, magnesium, aluminum, and silicon (CMAS) particulates in the form of volcanic ash, sand, dust, salt, etc. The particulates may be deposited on surfaces of various gas turbine components of the engine 20 (see, e.g., particulates P of FIG. 3). The engine 20 may operate at elevated temperatures. With elevated temperatures, the particulates may form a glass coating which may bond to, or otherwise accumulate on, surfaces of the components. The accretion of glass on the components may cause instability and reduce performance. The glass and/or other debris may substantially block or otherwise inhibit flow through cooling passages in the components. This may result in reduced cooling augmentation, which may decrease life of the component.

Figure 2:
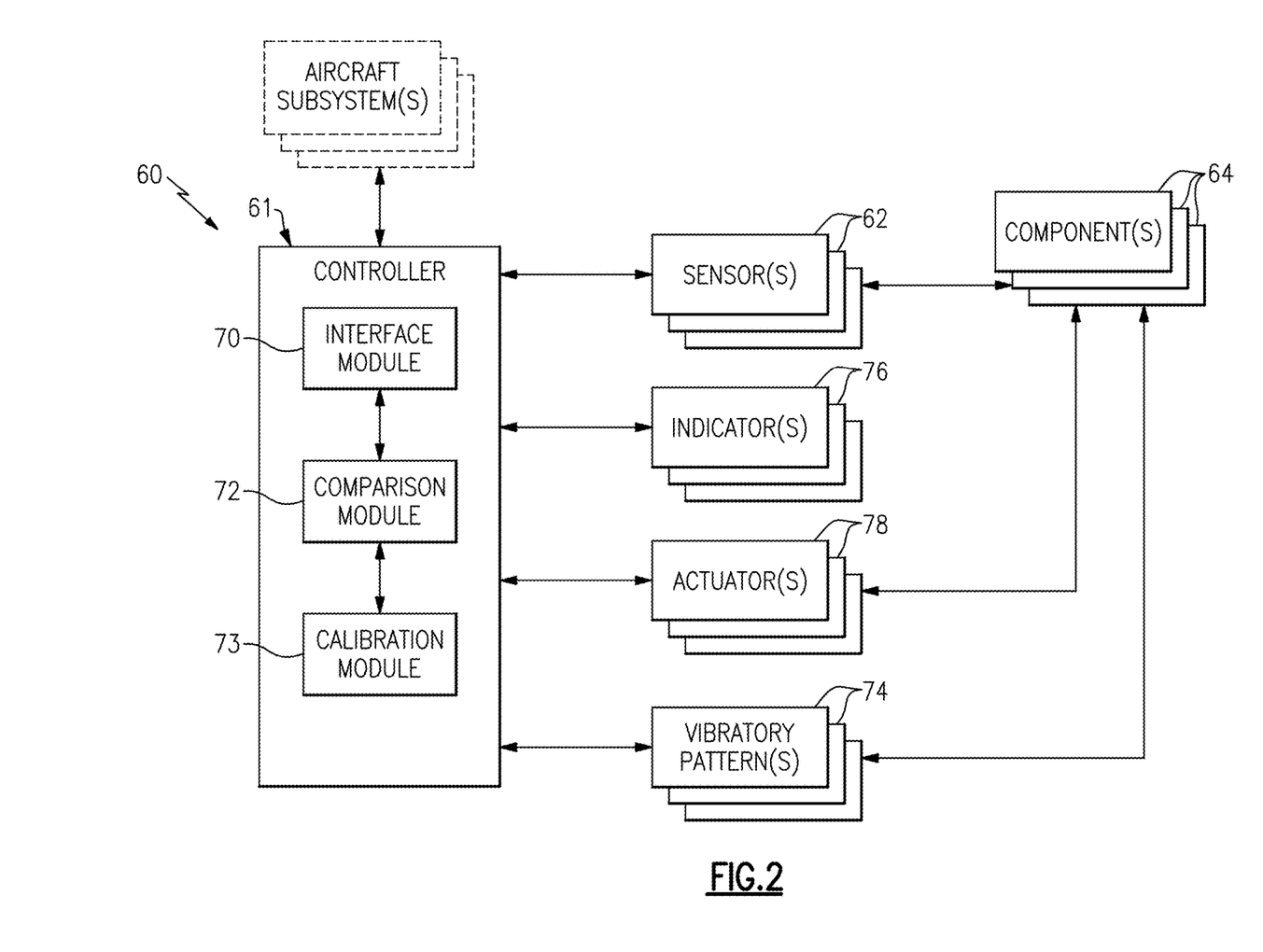
FIG. 2 discloses a detection system for a gas turbine engine.

Referring to FIG. 2, with continuing reference to FIG. 1, an accretion detection system 60 for a gas turbine engine is disclosed. The detection system 60 may be utilized to detect the accretion of glass and other debris on one or more of gas turbine engine components 64, including rotatable and/or static components of the engine 20. The system 60 may be utilized to provide prognostics and/or diagnostics associated with performance and maintenance of the engine 20. The components 64 may include rotatable and/or static components, such as one or more rotatable airfoils, hubs, ducts, etc. The components 64 may include any components of a gas turbine engine that may be exposed to environment debris, including any of the components of the engine 20. The system 60 may include a controller 61 operable to determine accretion of glass and/or other debris on one or more of the components 64. The controller 61 may include processor(s) and memory. In implementations, the controller 61 may be a full-authority digital electronic control (FADEC), an electronic engine control (EEC) and/or a separate controller. One would understand how to program and/or otherwise configure the controller 61 with logic to implement any of the teachings disclosed herein.

The system 60 may include one or more sensors 62 distributed throughout the engine 20 and/or associated aircraft. The sensors 62 may be configured to measure one or more conditions of the engine 20, including any of the conditions disclosed herein such as temperature, pressure, etc., associated with one or more of the components 64. The sensors 62 may be adjacent to, disposed along, and/or at least partially incorporated in one or more of the components 64. In implementations, one or more of the sensors 62 may be a vibration sensor operable to detect vibration of one or more adjacent components 64. Various vibration sensors may be utilized, including cameras, lasers and strain gauges. The controller 61 may be operatively coupled to the sensors 62, including wireless and/or wired connections.

Figure 3:
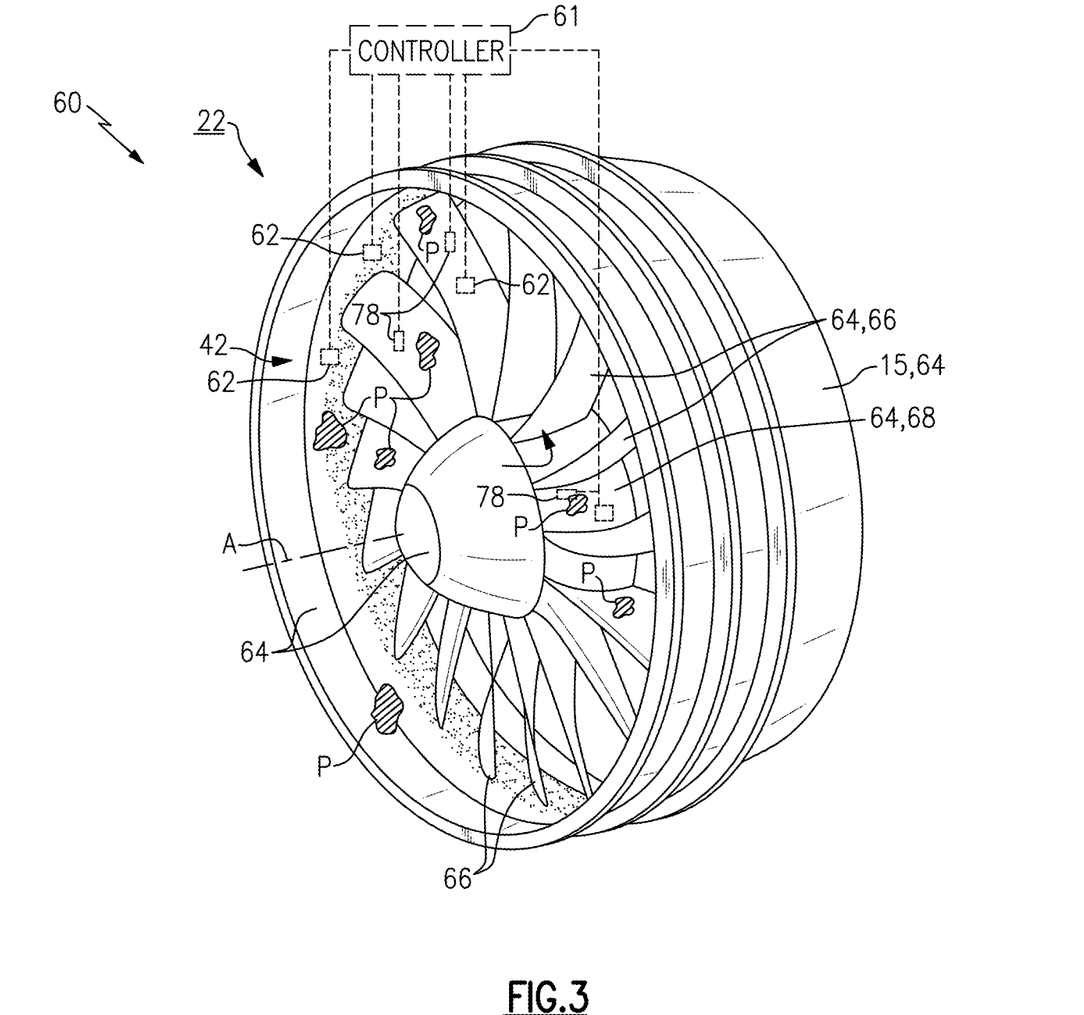
FIG. 3 discloses a section of a gas turbine engine.

In the implementation of FIG. 3, one or more sensors 62 may be incorporated in a propulsor section 22. The propulsor section 22 may include a propulsor 42 for generating thrust. A turbine may drive the propulsor 42, such as the turbine 46 (FIG. 1). Although the disclosure primarily refers to the propulsor section 22, it should be understood that other portions of the engine 20 may benefit from the teachings disclosed herein, including ducts and airfoils in the compressor section 24 and/or turbine section 28, combustor panels or liners in the combustor section 26, and other portions of the engine 20 that may be subject to elevated temperature conditions during engine operation. Other systems may benefit from the teachings disclosed herein, including gas turbine engines lacking a propulsor.

The section 22 may include one or more rotatable airfoils 66 distributed about a rotatable hub 68. The airfoils 66 may be rotatable about the engine axis A. The airfoils 66 may be propulsor blades for generating thrust, which in implementations may be fan blades 42 (FIG. 1).

One or more of the vibration sensors 62 may be operable to detect vibration of at least one or more of the airfoils 66, including at one or more rotational frequencies. The rotational frequency may be measured relative to an axis of rotation, such as the engine axis A. The rotational frequencies may be associated with rotation of the airfoils 66 at different rotational speeds about the engine axis A during operation of the engine 20. The vibration sensor 62 may be operable to detect vibration for rotational frequencies across any and all operating conditions of the engine 20 and/or associated aircraft, including ground idle, taxiing, maximum take-off, cruise and approach. The vibration sensor 62 may be operable to generate signal(s) associated with vibration of one or more of the airfoils 66 at one or more rotational frequencies.

Referring back to FIG. 2, with continuing reference to FIG. 3, the controller 61 may include an interface module 70, comparison module 72 and/or calibration module 73, which may be operable to communicate with each other. Although three modules are disclosed, it should be understood that the functionality of the controller 61 may be combined into a single module or may be implemented by two or more modules. The interface module 70 may be operable to communicate with one or more subsystems and/or sensors 62 to access various data and other information relating to operation of the engine 20, including one or more conditions of the component(s) 64 such as pressure, temperature, vibration, rotational speed, etc. The rotational speed may be measured in revolutions per minute (RPM). The interface module 70 may be operable to communicate with one or more subsystems of the engine and/or associated aircraft to obtain various conditions of the aircraft, such as velocity, altitude, etc. of the aircraft. The interface module 70 may be operable to communicate with one or more external systems (e.g., NASA) to obtain weather data and/or other information relating to the environmental conditions associated with the planned and/or actual flight path of the aircraft, such as dust patterns across the globe.

The comparison module 72 may be operable to detect or otherwise determine an accretion level associated with accretion of glass and/or other debris on the component(s) 64, such as one or more of the airfoils 66. The accretion level may be associated with a presence and/or an amount of glass and/or other debris on the component(s) 64, which may accumulate during flight.

Various techniques may be utilized to perform the determination. In implementations, the comparison module 72 may be operable to determine the accretion level in response to comparing vibration of the airfoil(s) 66 at one or more rotational frequencies of the respective the airfoil(s) 66 to one or more respective vibration thresholds. Each vibration threshold may be associated with a respective one of the rotational frequencies and/or range of rotational frequencies. The vibration threshold may be associated with an amplitude and/or other characteristic of the vibration.

One or more (e.g., predetermined) vibratory patterns 74 may be established for each of the components 64, including the airfoils 66. The vibratory pattern 74 may be associated with a single component 64. A common vibratory pattern 74 may be established for a set of components 64, such as an array of the airfoils 66. Vibration of each component 64 of the set of components 64 may be compared to the common vibratory pattern 74. The vibratory pattern 74 may be established prior to and/or during operation of the engine 20. The vibratory pattern 74 may be established based on the specific component 64 incorporated into the engine 20 and/or a representative component associated with the specific component 64. The representative component may be a prototype, a component from the same lot, a parametric model, etc. The rotational frequencies and respective vibration thresholds may be associated with the respective vibratory pattern 74.

The comparison module 72 may be operable to determine an accretion condition associated with accretion of glass and/or other debris on the respective airfoil(s) 66 in response to comparing signal(s) from the vibration sensor(s) 62 to the respective vibratory pattern 74. The comparison module 72 may be operable to determine the accretion condition in response to comparing an amplitude associated with the signal(s) generated by the vibration sensor(s) 62 to the vibration threshold associated with the respective rotational frequency.

The vibration sensor(s) 62 may be positioned a distance from the airfoils 66. In implementations, the vibration sensors 62 may be time-of-arrival sensors operable to determine passing of a component such as the rotatable airfoils 66 through a detection field (e.g., line of sight) of the respective sensor 62. The comparison module 72 may be operable to determine a blade passing frequency in response to signal(s) from the vibration sensor(s) 62 associated with passing of the one or more airfoils 66 through the detection field. The blade passing frequency may be calculated as a product of a rotational speed and total number of airfoils 72 in an array. The comparison module 72 may be operable to calculate a deviation based upon a comparison of an expected time of arrival and an actual time of arrival of an edge or other feature of the airfoil 66. The amplitude of the vibration may be associated with a difference between the expected time of arrival and actual time of arrival of the airfoil 66. The comparison module 72 may be operable to filter and/or average two or more amplitudes from a set of the blade passing frequency information. The filtered and/or averaged amplitudes may compared to the vibration threshold(s).

The calibration module 73 may be operable to perform a calibration sequence in which a baseline is established for one or more of the components 64. The calibration module 73 may perform the calibration sequence prior to, during and/or subsequent to flight. The baseline may be associated with vibration of the respective component 64 when surfaces of the component 64 are substantially free of any environmental debris (e.g., particulates of less than 1 micron in size). The baseline may be associated with vibration at the respective rotational frequencies of the vibratory pattern 74. The calibration module 73 may be operable to adjust or otherwise set the vibration threshold(s) based on vibration associated with the baseline.

The rotational frequencies of the component 64 may be selected based on observing the vibratory response(s) of the component 64 during engine operation. The component 64 may exhibit different vibratory responses across different rotational frequencies. In implementations, the vibratory pattern 74 may be associated with two or more rotational frequencies of the respective component 64. The vibratory pattern 74 may be associated with two or more vibration thresholds. Each of the vibration thresholds may be associated with the respective rotational frequencies. Vibration may be associated with an amplitude at each of the respective rotational frequencies. In the implementation of FIG. 5C, a set of vibration thresholds T1 to T4 associated with respective rotational frequencies is disclosed.

Various techniques may be utilized to establish the vibration thresholds. In implementations, the vibration thresholds may be assigned independently of the other vibration thresholds associated with the same vibratory pattern 74. In other implementations, one or more of the vibration thresholds may be assigned relative to one or more other vibration thresholds associated with the same vibratory pattern 74. The vibration thresholds may include a first vibration threshold and a second vibration threshold. The first vibration threshold may be associated with a first rotational frequency of the component 64. The second vibration threshold may be associated with a second rotational frequency of the component 64. The first vibration threshold may be assigned a value or percentage that is above or below the second vibration threshold (e.g., ±10 percent).

The comparison module 72 may be operable to determine the accretion level in response to comparing at least one amplitude associated with vibration of the airfoil 66 and/or component 64 at the respective rotational frequency to the respective vibration threshold associated with the vibratory pattern 74. The comparison module 72 may be operable to determine the accretion level in response to determining that the amplitude(s) of vibration meet one or more, or all of, the respective vibration threshold(s) associated with the vibration patter 74.

Figure 4A:
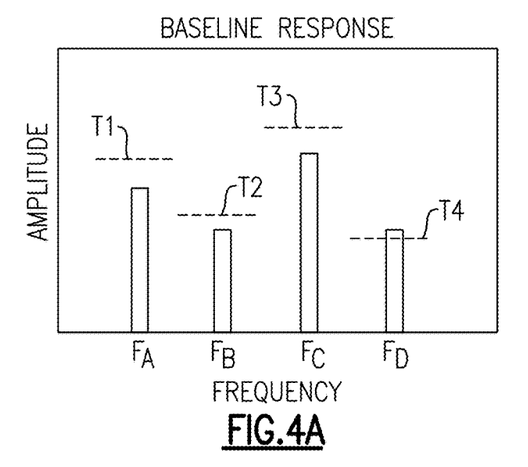
FIGS. 4A-4C disclose plots associated with accretion of debris on a component.
Figure 4B:
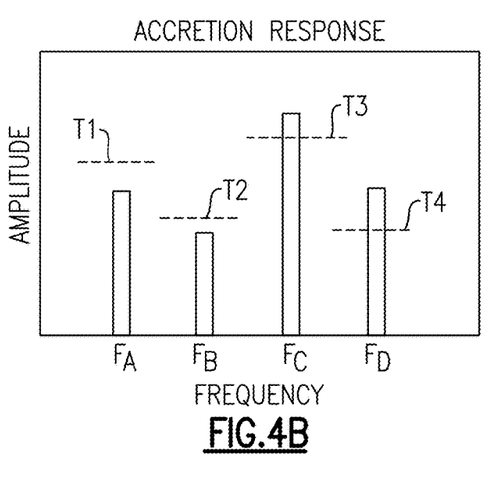
Figure 4C:
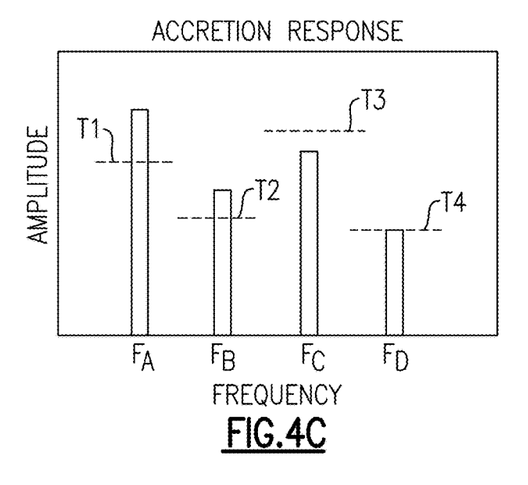

The vibratory pattern 74 may be established based on different amounts of accretion of glass and/or other debris and associated vibration for each of the amounts of accretion at the rotational frequencies. FIGS. 4A-4C disclose plots associated with accretion of glass on a static or rotatable component, such as a rotatable blade. The plots disclose amplitudes of vibration with respect to a set of distinct rotational frequencies (e.g., frequencies FA to FD). The frequencies may be measured in hertz (Hz). FIG. 4A may be associated with a baseline response in which substantially no glass and/or other debris is disposed on the component. FIG. 4B may be associated with an amount of glass and/or other debris disposed on the component, such as approximately 1 micron in size. FIG. 4C may be associated with a different (e.g., lesser or greater) amount of glass and/or other debris disposed on the component. The amplitudes are associated with a vibratory response of the component at the respective rotational frequencies. The set of amplitudes may be utilized to establish a vibratory pattern 74 for the respective component. The vibratory pattern 74 may exclude one or more frequencies and/or ranges of frequencies between the rotational frequencies that define the vibratory pattern 74. In implementations, the rotational frequencies associated with the vibratory pattern 74 may be associated with respective operating conditions of the engine 20, such as different rotational speeds of the spools 30, 32 (e.g., idle and redline speeds), and/or operating conditions of the associated aircraft such as ground idle, maximum take-off, cruise, approach and/or landing.

The comparison module 72 may be operable to cause one or more indicators 76 to be generated based on the detected accretion of glass and/or other debris on the component(s) 64. The indicators 76 may include a visual or audible warning to the cockpit or crew. The indicators 76 may include one or more flags or maintenance indicators to alert maintenance crews that one or more specified components 64 of the engine 20 are associated with an accretion condition. The maintenance indicators may require clearing by maintenance personnel once the maintenance indicators have been set. The comparison module 72 may be operable to cause one or more indicator 76 to be generated in response to determining the accretion of glass and/or other debris on the component(s) 64. The comparison module 72 may be operable to cause one or more indicator 76 to be generated in response to determining that the accretion level meets an (e.g., predetermined) accretion threshold. The accretion threshold may be the presence of glass and/or other debris. In implementations, the accretion threshold may be a predetermined mass and/or thickness the debris on the surfaces of the component 64 (e.g., 1 micron or more), which may be associated with reduced performance.

Figure 5:
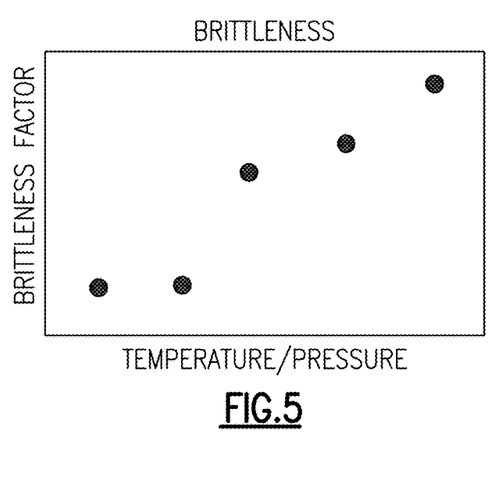
FIG. 5 discloses a plot associated with brittleness of debris on a component.

The comparison module 72 may be operable to determine a brittleness characteristic (e.g., factor) associated with accretion of glass based on the accretion level. The brittleness factor may be calculated according to the Brinell hardness factor. The brittleness may be determined based on the amount of accretion. FIG. 5 discloses a plot associated with brittleness according to an implementation. The comparison module 72 may be operable to obtain information from one or more of the sensors 62 and/or aircraft systems relating to operating conditions within the engine 20 and/or environmental conditions of an associated aircraft. The conditions may include dust ingestion, temperature, and/or pressure. The comparison module 72 may be operable to compare the measured condition(s) to a parametric model or relationship to determine the brittleness characteristic of the accumulated glass. The determined brittleness may be utilized to indicate a removal technique. The determined brittleness may be compared to a total time on wing and/or time since the last maintenance cycle of the engine 20, which may be utilized to set and/or adjust any of the thresholds and/or durations disclosed herein.

The controller 61 may be operable to cause a change in operation of the engine 20 in response to determining the accretion of glass and/or other debris on the component(s) 64. The comparison module 72 may be operable to cause excitation of the component(s) 64, such as one or more of the airfoils 66, to remove or otherwise release the glass and/or other debris. The comparison module 72 may be operable to cause the excitation in response to determining the occurrence of an accretion condition. The comparison module 72 may be operable to cause the excitation to remove or otherwise release the glass and/or other debris associated with a determined accretion (e.g., amount) level in response to determining that the accretion level meets an accretion threshold. In implementations, the vibratory pattern 74 may include a set of vibratory responses associated with different amounts of accretion utilized to establish the baseline. The comparison module 72 may determine the present amount of accretion in response to comparing the measured vibration at the rotational frequencies to the set of vibratory responses of the vibratory pattern 74 to determine a "best fit" associated with predetermined amounts of accretion (e.g., the plots of FIGS. 4A-4C). For example, each of the plots of FIGS. 4A-4C may be associated with a respective vibratory response based on different amounts of accretion. The vibratory pattern 74 may be associated with the set of vibratory responses, which represent different amounts of accretion (or lack thereof). The best fit may be determined by comparing a summation of the (e.g., absolute) differences between the measured and predetermined amplitudes for the set of the rotational frequencies and assigning the accretion level associated with the vibratory response of the vibratory pattern 74 that has the least total difference (e.g., accretion level associated with one of the plots of FIGS. 4A-4C). The set of vibratory responses may be a set of datasets associated with different amounts of accretion and respective amplitudes, which may include and/or differ from the baseline vibratory response.

Various techniques may be utilized to excite the components 64. In implementations, the comparison module 72 may be operable to cause excitation of the airfoil(s) 66 and/or other component(s) 64 to release the glass and/or other debris in response to causing a change in rotational speed of the component(s) 64 such that the rotational frequency approaches a resonant frequency of the respective component(s) 64, which may cause a substantially instantaneous surge or response. The resonant frequency may differ from the baseline vibratory response of the component 64. The component 64 may flutter or otherwise vibrate at the resonant frequency for a sufficient duration to remove or otherwise release the glass and/or other debris. The comparison module 72 may be operable to cause the component 64 to rotate at approximately the resonant frequency for a predetermined duration. The comparison module 72 may be operable to block requests to change the rotational speed during the predetermined duration, but the comparison module 72 may be operable to permit requests to change the rotational speed prior and/or subsequent to the predetermined duration.

The comparison module 72 may be coupled to one or more actuators 78. The actuators 78 may be adjacent to, disposed on, and/or incorporated into the components 64 (e.g., FIG. 3). Various actuators 78 may be utilized, such as a piezo-electric component responsive to an electrical signal. The comparison module 72 may be operable to cause excitation of the airfoil(s) 66 and/or other component(s) 64 to remove or otherwise release the glass and/or other debris in response to actuating one or more of the respective actuators 78.

Figure 6:
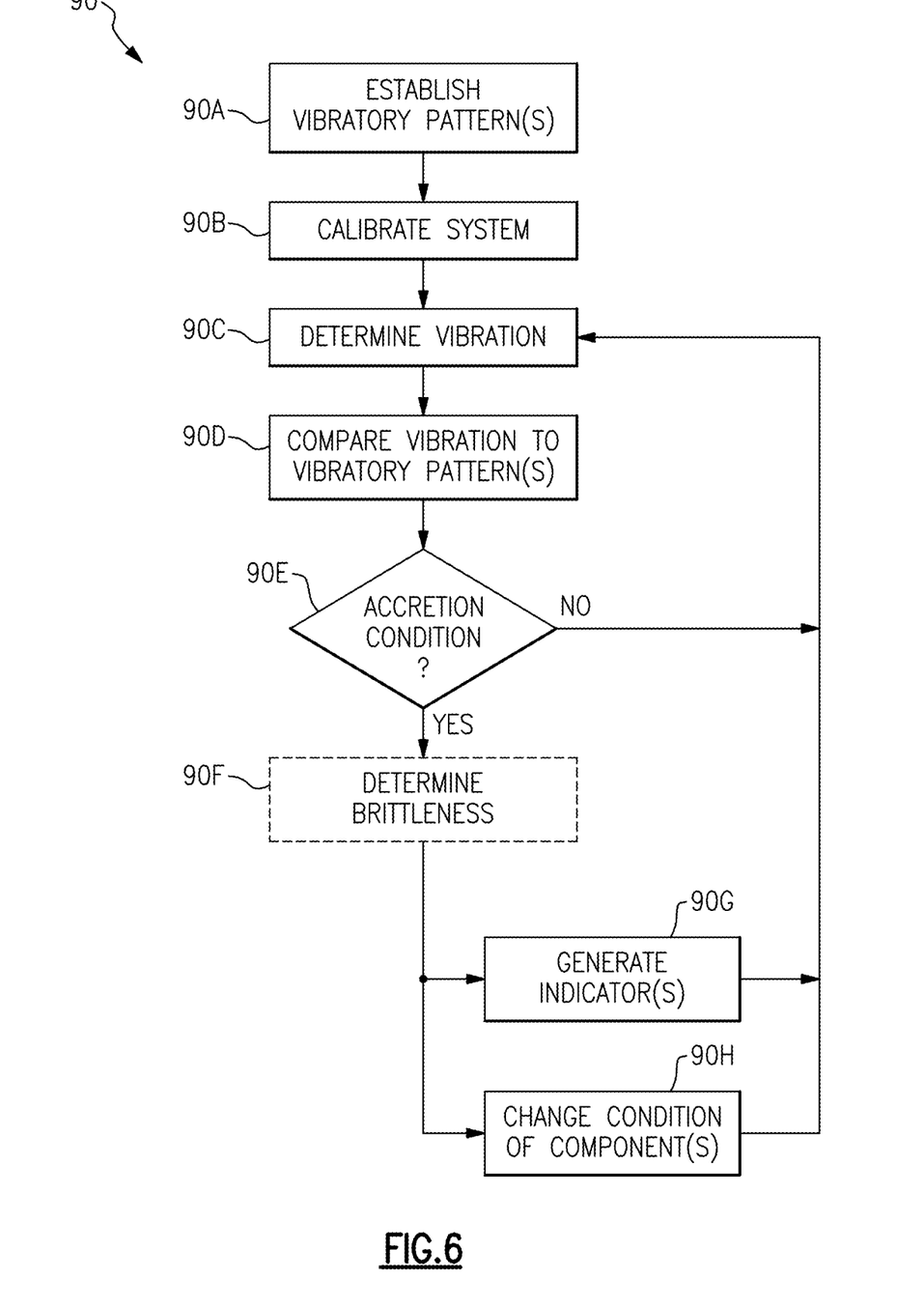
FIG. 6 discloses a method of operation associated with detecting accretion of debris on a component.

FIG. 6 discloses a method of operation in a flowchart 90. The method 90 may be utilized in operation of a gas turbine engine, such as the engine 20. Fewer or additional steps than are recited below could be performed within the scope of this disclosure, and the recited order of steps is not intended to limit this disclosure. The controller 61 and any of the modules 70, 72, 73 may be programmed with logic for performing method 90. Reference is made to the engine 20 and detection system 60.

At step 90A, one or more vibratory patterns 74 may be established for one or more gas turbine engine components 64, such as airfoils 66. The vibratory pattern 74 may be associated with a vibratory response of the component 64 to glass and/or other debris on surfaces of the component 64. The vibratory pattern 74 may be established utilizing any of the techniques disclosed herein. The vibratory pattern 74 may be predetermined prior to operation of the engine 20. The vibratory pattern 74 may be established based on accretion of glass and/or other debris at one or more rotational frequencies of the component 64. Step 90A may include establishing the vibratory pattern 74 based on the specific component 64 incorporated into the engine 20 and/or a representative component associated with the specific component 64. Establishing the vibratory pattern 74 may include establishing one or more vibration thresholds associated with accretion of glass and/or other debris at the respective rotational frequencies.

At step 90B, a model incorporating the vibratory pattern(s) 74 may be calibrated. The calibration module 73 and/or another portion of the system 60 may incorporate the model. Calibrating the model may include determining a vibratory response of the component 64 during a baseline condition in which substantially no glass and/or other debris is disposed on the component 64. The baseline vibratory response of the component 64 may be determined at the one or more, or all, rotational frequencies associated with the vibratory pattern 74. Calibrating the model may include adjusting one or more vibratory thresholds associated with the vibratory pattern 74 based on the baseline vibratory response of the component 64. Calibrating the model may improve accuracy in determining accretion of glass and/or other debris on the component 64. In other implementations, step 90B may be omitted.

At step 90C, vibration of the component(s) 64 may be determined, such as the airfoil(s) 66. Step 90C may include determining vibration of the component 64 at one or more, or all, rotational frequencies associated with the vibratory pattern 74 during engine operation. The rotational frequencies may be associated with minimum, intermediate and/or maximum rotational speeds of the component 64. The rotational frequencies may be associated with any of the engine and/or aircraft conditions disclosed herein. Step 90C may include determining one or more amplitudes associated with the vibration at the rotational frequencies.

At step 90D, the vibration may be compared to the vibratory pattern 74 of the respective component 64. Various techniques may be utilized to determine the vibration, including any of the techniques disclosed herein.

At step 90E, an accretion condition may be determined based on the comparison at step 90D. The accretion condition may be associated with a determination that glass and/or other debris is disposed on surfaces of the component 64, which may exhibit a vibratory response associated with the vibratory pattern 74. Step 90E may include determining an accretion of glass and/or other debris on the component 64 in response to comparing the determined vibration to the vibratory pattern 74, which may include comparing the vibration to one or more vibration thresholds associated with the respective rotational frequencies of the vibratory pattern 74. Determining the accretion of glass and/or other debris may include determining that the measured amplitude(s) associated with the vibration meet the respective vibration threshold(s). In implementations, the vibration threshold may be met when the amplitude is equal to or greater than the vibration threshold. In other implementations, the vibration threshold may be met when the amplitude is less than or equal to the vibration threshold.

At step 90F, a brittleness of the detected glass and/or other debris may be determined. The brittleness may be determined utilizing any of the techniques disclosed herein. The determined brittleness may be utilized to set and/or adjust any of the threshold(s) disclosed herein, the duration for exciting the component 64, and/or criterion for generating the indicator(s) 76.

At step 90G, one or more indicators 76 may be generated. Step 90F may include generating the indicator(s) 76 in response to determining the accretion of glass and/or other debris associated with the vibration. The indicators 76 may be utilized according to any of the teachings disclosed herein. In implementations, maintenance crew may wash or otherwise clean the component(s) 64 and/or engine 20 in response to the indicator(s) 76.

At step 90H, the method may cause a change in one or more conditions of the component(s) 64, including during operation of the engine 20 in maintenance and/or in flight. Step 90H may include exciting the airfoil 66 or other component 64 to release at least a portion of the glass and/or other debris from the component 64 in response to determining the accretion. Various techniques may be utilized to excite the component 64, including any of the techniques disclosed herein. In implementations, step 90H may include changing a rotational speed of the airfoil 66 or other component 64 such that the rotational speed is substantially equal to or otherwise approaches a (e.g., predetermined) resonant frequency of the component 64. The component 64 may vibrate at approximately the resonant frequency for a predetermined duration, or otherwise for a sufficient time, to remove or otherwise release the glass and/or other debris. The terms "approximately," "about" and "substantially" mean±10 percent of the stated value or relationship unless otherwise indicated. Step 90H may include blocking requests to change the rotational speed during the predetermined duration, but may include permitting requests to change the rotational speed prior and/or subsequent to the predetermined duration. Step 90C to 90E may be repeated to validate that the component 64 is operating at substantially the baseline and/or calibrated vibratory response.

The systems and methods disclosed herein may be utilized to determine the accretion of glass and/or other debris on surfaces of various components of a gas turbine engine. The determination may be made during maintenance and/or in flight. The glass and/or other debris may be removed or otherwise released from the surfaces utilizing any of the techniques disclosed herein. The disclosed techniques may reduce external intervention that may otherwise be necessary to clean the surfaces to meet operational standards. Removing the debris may improve engine performance and time on wing.

It should be understood that relative positional terms such as "forward," "aft," "upper," "lower," "above," "below," and the like are with reference to the normal operational altitude of the engine and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of determining an accretion of glass on a rotatable airfoil in a gas turbine engine, the method comprising:
    establishing a vibratory pattern based on accretion of glass at one or more rotational frequencies, wherein establishing the vibratory pattern includes establishing one or more vibration thresholds associated with accretion of glass at the one or more respective rotational frequencies, wherein the vibratory pattern is established based on different amounts of accretion of glass and associated vibration for each of the different amounts of accretion of glass at the respective one or more rotational frequencies;
    determining vibration of the rotatable airfoil at the one or more rotational frequencies, wherein determining the vibration includes determining one or more amplitudes associated with the vibration at the one or more rotational frequencies;
    comparing the determined vibration of the rotatable airfoil to the vibratory pattern; and
    determining the accretion of glass on the rotatable airfoil in response to comparing the determined vibration of the rotatable airfoil to the vibratory pattern, wherein determining the accretion of glass on the rotatable airfoil includes determining that the one or more amplitudes meet the one or more respective vibration thresholds.

2. The method as recited in claim 1, wherein the one or more rotational frequencies include a plurality of rotational frequencies, and the one or more vibration thresholds includes a plurality of vibration thresholds associated with the respective rotational frequencies.

3. The method as recited in claim 1, further comprising: generating an indicator in response to determining the accretion of glass on the rotatable airfoil.

4. The method as recited in claim 1, further comprising: exciting the rotatable airfoil to release at least a portion of the glass from the rotatable airfoil in response to determining the accretion of glass on the rotatable airfoil.

5. The method as recited in claim 4, wherein exciting the rotatable airfoil includes changing a rotational speed of the rotatable airfoil such that the rotational speed approaches a resonant frequency of the rotatable airfoil.

6. The method as recited in claim 5, further comprising: determining a brittleness characteristic associated with accretion of glass based on the determined accretion of glass on the rotatable airfoil.

7. The method as recited in claim 6, further comprising: setting a duration for the excitation of the rotatable airfoil based on the determined brittleness characteristic.

8. The method as recited in claim 1, further comprising: generating an indicator in response to determining that the accretion of glass on the rotatable airfoil meets an accretion threshold.

9. The method as recited in claim 1, further comprising: determining a brittleness characteristic associated with accretion of glass based on the determined accretion of glass on the rotatable airfoil.

10. The method as recited in claim 1, further comprising: exciting the airfoil to release debris associated with the determined accretion of glass on the rotatable airfoil in response to the determined accretion of glass on the rotatable airfoil meeting an accretion threshold.

11. The method as recited in claim 10, wherein exciting the rotatable airfoil includes causing a rotational speed of the rotatable airfoil to approach a resonant frequency of the rotatable airfoil.

12. The method as recited in claim 10, further comprising: determining a brittleness characteristic associated with accretion of glass based on the determined accretion of glass on the rotatable airfoil; and setting the accretion threshold based on the determined brittleness characteristic.

13. The method as recited in claim 11, wherein: the rotatable airfoil is a propulsor blade for generating thrust.

14. The method as recited in claim 1, wherein determining the accretion of glass on the rotatable airfoil further includes determining a best fit of vibration at the one or more rotational frequencies to a set of vibratory responses associated with the vibratory pattern and respective amounts of accretion.

15. The method as recited in claim 1, further comprising: receiving a signal from a vibration sensor configured to measure vibration of the rotatable airfoil.

16. The method as recited in claim 15, wherein comparing the determined vibration of the rotatable airfoil to the vibratory pattern includes comparing the signal to the vibratory pattern.

17. The method as recited in claim 1, wherein: the rotatable airfoil is a propulsor blade for generating thrust.

* * * * *